(12) United States Patent
Crickmore et al.

(10) Patent No.: US 7,652,245 B2
(45) Date of Patent: Jan. 26, 2010

(54) TRAFFIC SENSING AND MONITORING APPARATUS

(75) Inventors: Roger Ian Crickmore, Dorchester (GB); David John Hill, Dorchester (GB)

(73) Assignee: Qinetiq Limited (GB)

( * ) Notice: Subject to any disclaimer, the term of this patent is extended or adjusted under 35 U.S.C. 154(b) by 44 days.

(21) Appl. No.: 12/091,076

(22) PCT Filed: Oct. 18, 2006

(86) PCT No.: PCT/GB2006/003862

§ 371 (c)(1),
(2), (4) Date: Jun. 18, 2008

(87) PCT Pub. No.: WO2007/049004

PCT Pub. Date: May 3, 2007

(65) Prior Publication Data

US 2008/0277568 A1 Nov. 13, 2008

(30) Foreign Application Priority Data

Oct. 25, 2005 (GB) .................................. 0521713.8

(51) Int. Cl.
*G01J 1/04* (2006.01)
(52) U.S. Cl. .............................. 250/227.12; 250/227.14
(58) Field of Classification Search ............ 250/227.12, 250/227.14, 227.15, 227.16, 227.18; 340/556, 340/557, 540, 541, 907; 398/139
See application file for complete search history.

(56) References Cited

U.S. PATENT DOCUMENTS 5,418,360 A * 5/1995 Sokolowska et al. ... 250/227.12
5,883,585 A 3/1999 Akutsu et al.

FOREIGN PATENT DOCUMENTS

| DE | 197 27 225 | 1/1998 |
|----|------------|--------|
| GB | 2 222 247 | 2/1990 |
| GB | 2262803 | 6/1993 |
| GB | 2413629 | 11/2005 |
| WO | WO 98/27406 | 6/1998 |
| WO | WO 02/057805 | 6/2001 |
| WO | WO 02/065424 | 8/2002 |
| WO | WO 02/065426 | 8/2002 |

* cited by examiner

*Primary Examiner*—Que T Le
*Assistant Examiner*—Don Williams
(74) *Attorney, Agent, or Firm*—McDonnell Boehnen Hulbert & Berghoff LLP

(57) ABSTRACT

Traffic sensing and monitoring apparatus (100) comprises a length of optical fiber (112), means (102, 103, 104, 106, 107, 109, 119) arranged to introduce a series of pulse pairs into an input end of the length, each of the pulse pairs comprising first and second pulses of radiation having a frequency difference $\Omega$ and the second pulse being delayed with respect to the first by a delay $\tau$, and the apparatus further comprising a photodetector arranged to detect radiation which is Rayleigh-backscattered within the length of fiber towards the input end to generate an output signal in response thereto. Apparatus of the invention allows sensing and monitoring of traffic at any position along a long length of road (e.g. 5 km) with lower installation and maintenance costs per unit length compared to prior art systems providing the same spatial resolution.

14 Claims, 2 Drawing Sheets

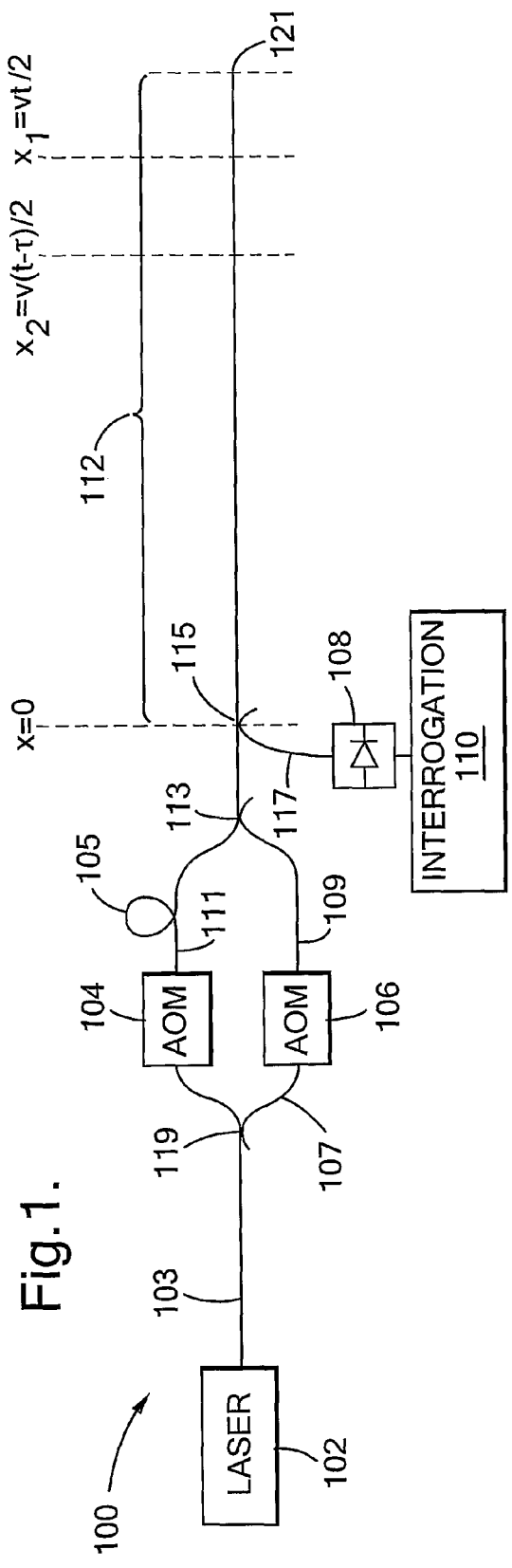
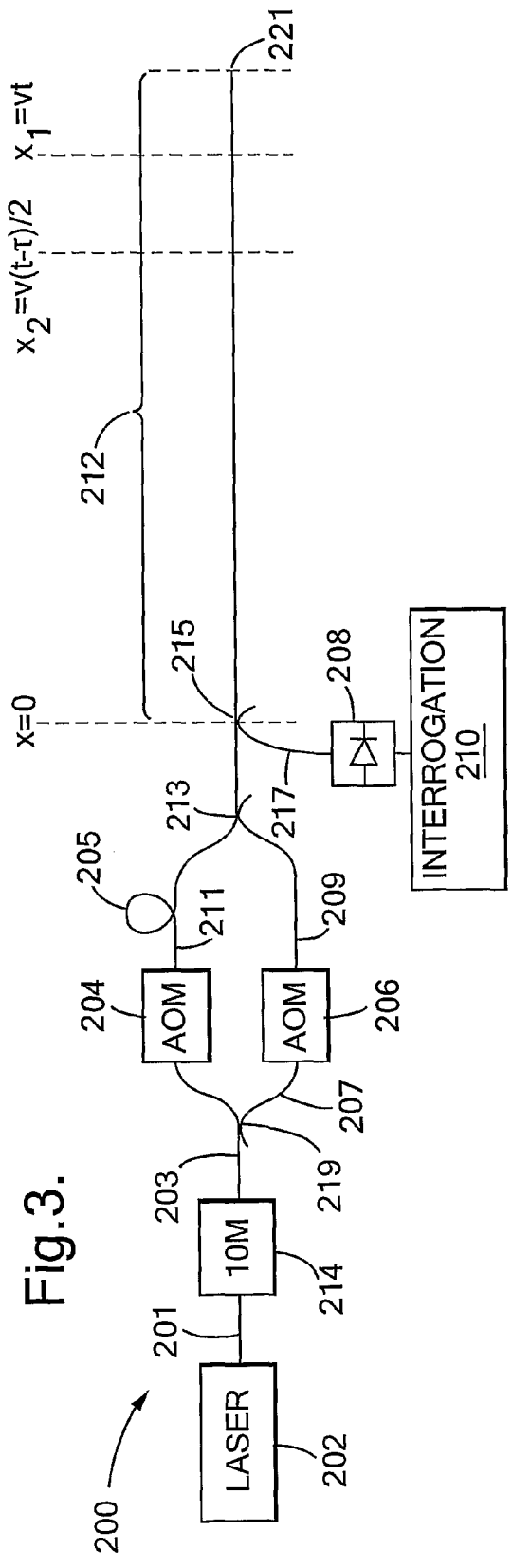
Fig.1.
Fig.3.

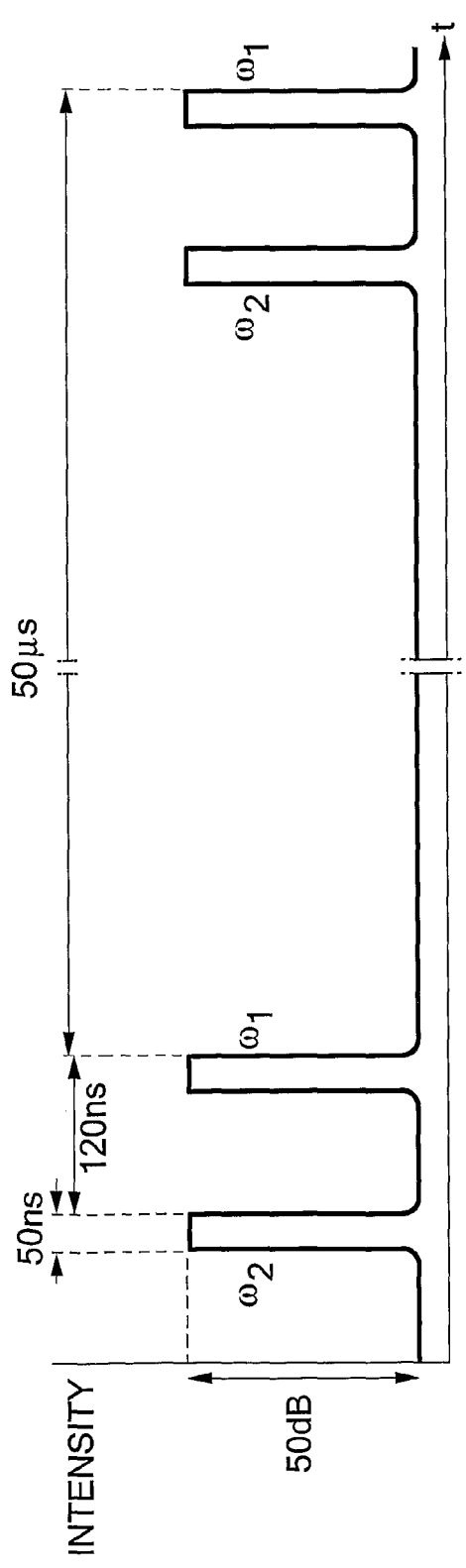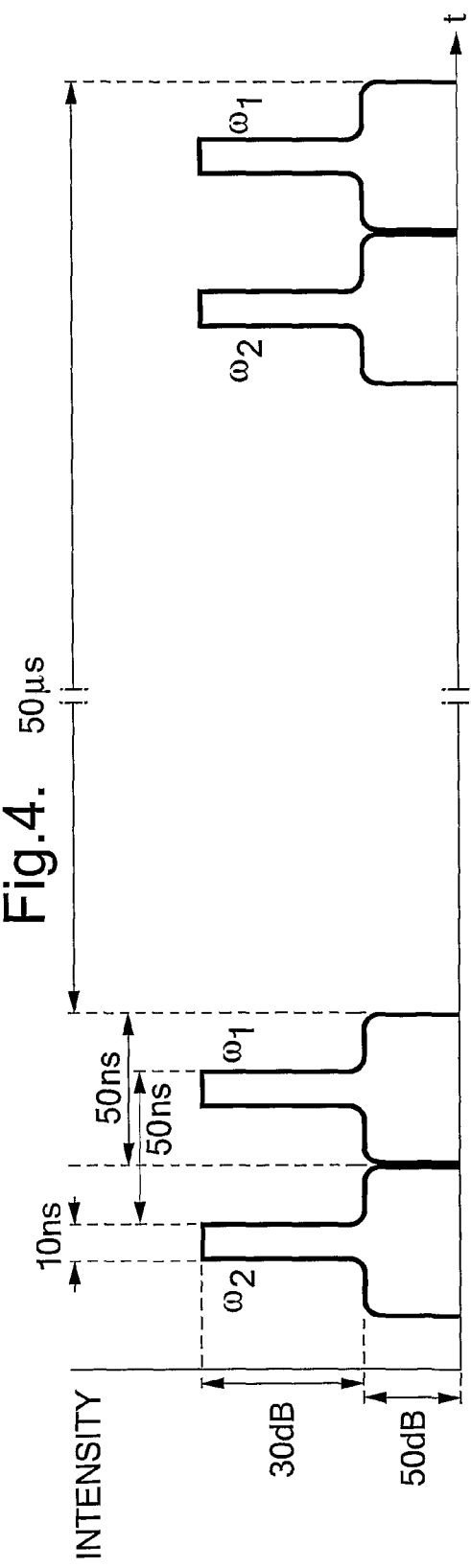

TRAFFIC SENSING AND MONITORING APPARATUS

BACKGROUND OF THE INVENTION (1) Field of the Invention

The present invention relates to apparatus and methods for sensing and monitoring traffic, particularly, although not exclusively, road-traffic. For example, the invention may also be applied to the sensing and monitoring of rail traffic or aircraft on runways.

(2) Description of the Art

The ability to sense and monitor motor vehicles on a length of road or a length of a lane of a multi-lane highway is useful as it allows detection of congested portions of road. Such detection allows drivers to be given advance warning of such portions, preventing further traffic build-up. If the sensing and monitoring is sufficiently detailed, such detection also allows authorities to make appropriate use of available road resources. For example, when lanes of a portion of motorway become congested, the hard-shoulder may be made available for ordinary use by motorists. In the long-term, detailed information on traffic density is useful in long-term planning of upgrading or improving existing roads and building new ones.

At present, apparatus for sensing and monitoring road traffic provides only sparse information concerning traffic conditions along roads due to the expense and limited range of current traffic sensing and monitoring apparatus. CCTV systems only provide clear views of traffic over distances of approximately 50 m. Inductive loop sensors can only provide information at a point and are generally only installed in roads using a relatively large separation (e.g. 500 m) between consecutive sensors because a higher linear density of sensors is prohibitively expensive. This is because each inductive loop sensor requires individual processing electronics and a power supply. These types of apparatus can only provide the type of detailed information required for efficient road management if they are installed at frequent intervals and therefore high cost. Installation of these systems at frequent intervals also gives rise to high maintenance costs due to the employment of large amounts of hardware. In the case of inductive loop sensors there is an additional problem of high installation costs associated with frequent installation.

Current traffic sensing and monitoring apparatus can only provide a high level of traffic information per unit of road length together with high purchase, installation and maintenance costs.

SUMMARY OF THE INVENTION

It is an object of the invention to ameliorate at least one of these problems. According to a first aspect of the invention, this object is achieved by traffic monitoring apparatus comprising a length l of optical fibre, means arranged to introduce a series of pulse pairs into an input end of the length, each of the pulse pairs comprising first and second pulses of radiation having a frequency difference $\Omega$ and the second pulse being delayed with respect to the first by a delay $\tau$, and the apparatus further comprising a photodetector arranged to detect radiation which is Rayleigh-backscattered within the length of fibre towards the input end and to generate an output signal in response thereto. In use, the length of optical fibre is deployed on or beneath a surface for carrying vehicles such that the weight of a vehicle using the surface may act on the length. A moving vehicle located above a section of the length of fibre defined by positions at which respective portions of the first and second pulses of each pulse pair are Rayleigh-backscattered such that they arrive simultaneously at the photodetector causes the frequency of the photodetector's output signal to deviate from the value $\Omega$, thus indicating the presence of a moving vehicle above that section. Apparatus of the invention allows any section of a relatively long distance of (e.g.) road, to be monitored, e.g. several kilometres. Deployment of the length of optical fibre is simple compared to that of a series of inductive loop sensors providing the same spatial resolution as apparatus of the present invention. Furthermore the length of fibre is passive and therefore requires no maintenance. The use of pulses of radiation of different frequencies to generate a beat signal allows subsequent processing of the signal to be carried out more easily and with a greater signal-to noise ratio than is the case if radiation of a single frequency Rayleigh-backscattered from different positions along the length of optical fibre is used to generate a signal at a photodetector by interferometery.

The length of fibre may be several kilometres. To provide traffic sensing and monitoring over longer distances, several units of the apparatus may be installed with their respective lengths of fibre arranged contiguously, or near contiguously.

In the case of roads having multiple lanes per carriageway such as a motorway or autobahn, units of the apparatus may be installed beneath each lane.

The maximum rate at which the length of fibre may be interrogated is v/2l, where v is the speed of pulses in the fibre, since 2l/v is the time taken for a pulse to make a round-trip within the length of fibre.

The delay $\tau$ between individual pulses in a pulse pair fixes the distance $v\tau/2$ between positions along the length of fibre at which respective portions of the pulses a given pulse pair are Rayleigh backscattered such that the portions arrive simultaneously at the photodetector. Preferably $\tau$ is set to a value such that $v\tau/2$ substantially corresponds to the length of a typical vehicle to be sensed. The photodetector output signal at a particular time after each pulse pair enters the length of fibre then provides information on the presence or absence of a single moving vehicle, or part of a moving vehicle, on a section of road corresponding to the particular time.

Preferably the apparatus further comprises an interrogation system arranged to obtain a set of signal samples by sampling the photodetector's output signal at a particular time to after the first pulse of each pulse pair enters the length l of optical fibre, and to process the signal samples to generate an output signal corresponding to the frequency or phase of a signal composed of said samples. This allows a section of the length of fibre corresponding to the particular time to be monitored over a significant period of time.

In order to avoid problems associated with low backscatter which may occasionally occur when monitoring a particular section of road, the interrogation system is preferably arranged to obtain sets of signal samples by sampling the photodetector output signal at times such as $t_0-\Delta t$, $t_0$ and $t_0+\Delta t$ after the first pulse of each pulse pair enters the length l of optical fibre and to process the set having samples corresponding to the largest signal with a frequency of approximately $\Omega$. Additionally, the interrogation system may be arranged to change the set which is processed from a first set to a second set when the samples of the second set correspond to signal exceeding that of a signal to which samples of the first set correspond by at least a pre-determined amount. This reduces the frequency at which the processed sample set is changed and thus reduces instances of discontinuity in the output signal.

To avoid discontinuity in the output signal, the interrogation system is preferably arranged such that when the set which is processed is changed from a first set to a second set, both sets are processed for a period to generate first and second output signals, the interrogation system being further arranged to evaluate the difference between the second and the first output signals and to apply a corresponding offset to the second output signal to reduce any discontinuity between the first and second output signals. Preferably said period is no longer than is necessary to evaluate said difference so that efficient use is made of processing resources.

Preferably $\Delta t \leq \tau/10$ so that the section of the length of fibre giving rise to the photodetector output (beat) signal is not displaced from that originally intended to be interrogated by more than $1/10$ of the length of that section. This prevents interrogation of sections of fibre that are a significant distance away from that originally intended to be interrogated, thus preventing detection of another vehicle, or no vehicle at all.

To monitor moving traffic at various locations, each corresponding to a different section of the length of optical fibre, the interrogation system may be arranged to obtain a plurality of sets of signal samples by sampling the photodetector's output signal at each of a plurality of times after the first pulse of each pulse pair enters the length l of optical fibre, and to process the samples of each set to generate respective output signals each corresponding to the frequency or phase of a signal composed of samples of a given set. Preferably, consecutive times are separated in time by at least $v\tau/2$ to avoid overlap of adjacent interrogated sections of fibre.

The length of optical fibre is preferably a length of standard optical fibre, as such fibre has low optical losses compared to other commercially available fibre and therefore allows traffic monitoring over long distances, for example 5 km or more.

The presence of a vehicle above a first section of the length of optical fibre may occasionally give rise to a spurious signal from a second section located between the first section and the distal end of the length of optical fibre, i.e. when monitoring the second section of fibre, a deviant beat signal frequency is generated even when no moving vehicle is present on a corresponding section of road. This is due to radiation in the second section of fibre being phased modulated even in the absence of a moving vehicle on a corresponding section of road. This problem is ameliorated (if it arises) if the length of fibre is a length of polarisation-maintaining fibre and the means arranged to introduce the series of pulse pairs into the input end of the length of optical fibre is arranged to launch polarised pulse pairs into said length of fibre such that individual pulses are polarised along a principal axis of the length of fibre.

The means arranged to introduce a series of pulse pairs into an input end of the length of optical fibre may comprise first and second acousto-optic modulators (AOMs) arranged to receive at least partially coherent radiation and to output, respectively, a first pulse of radiation of frequency $\omega_1$ and a second pulse of radiation of frequency $\omega_2$, wherein $\omega_1 - \omega_2 = \Omega$, means for delaying the second pulse with respect to the first, and means for coupling the pulses into an optical fibre.

Conveniently, the apparatus comprises a laser and means arranged to input first and second portions of the laser's output into the first and second AOMs respectively.

The laser may be a cw laser, the AOMs being arranged for synchronous operation and the means for delaying the second pulse with respect to the first comprising an optical fibre delay loop.

Optimum operation of apparatus of the invention is achieved when the extinction ratio for the series of pulse pairs (i.e. the ratio of the intensity of an individual pulse to that of radiation input to the length of fibre between pulse pairs) is greater than $T/\tau_w$, where T is the period between pulse pairs and $\tau_w$ is the duration of individual pulses. An AOM typically provides an extinction ratio of around 50 dB and a minimum pulse duration of 50 ns. Thus, for a 5 km length of fibre interrogated at the maximum possible rate (20 kHz), the extinction ratio of an AOM exceeds minimum value defined above by around two orders of magnitude. However, a 50 ns pulse results in a spatial resolution of 10 m, which may be unacceptably large in certain situations. In order to produce shorter pulses whilst maintaining a satisfactory extinction ratio, the apparatus preferably further comprises an optical modulator arranged to receive the cw laser's output and to output pulsed radiation to said inputting means such that each AOM receives a portion of each pulse output by the modulator and wherein each AOM is arranged to increase the extinction ratio of a pulse input to it outside a time window including the pulse. In this way, the high extinction ratio provided by the AOMs may be combined with short pulse durations that are obtainable using other types of optical modulator, for example integrated optical modulators or a semiconductor optical amplifiers.

Where cw laser radiation is applied directly to the inputs of the AOMs, the means for delaying the second pulse of each pulse pair with respect to the first pulse thereof may comprise means for operating the AOMs asynchronously, as an alternative to employment of an optical fibre delay loop.

A pulsed laser may be used instead of a cw laser in order to generate pulses directly. An output pulse from the pulsed laser may be divided to give two portions which are delivered simultaneously to respective synchronously-operated AOMs, a fibre loop being employed to delay the output of one AOM with respect to the other. Alternatively, one of the portions could be delayed by a fibre loop prior to input to an AOM, the AOMs be operated asynchronously.

The pulse pairs may also be generated by passing the output radiation of a cw laser through a single AOM arranged to generate pulses at two different frequencies.

To allow processing of the photodetector output signal using standard electronic components, $\Omega$ is preferably in the range $40\,\text{kHz} \leq \Omega \leq 40\,\text{MHz}$. A photodiode is a convenient choice for the photodetector.

Corresponding to the first aspect of the invention, a second aspect of the invention provides a method of sensing and monitoring traffic, the method comprising the steps of
(i) providing a length of optical fibre on or below a surface for carrying vehicles such that the weight of a vehicle using the surface may act on said length;
(ii) introducing a series of pulse pairs into an input end of the length, each of the pulse pairs comprising first and second pulses of radiation having a frequency difference $\Omega$ and the second pulse being delayed with respect to the first by a delay $\tau$; and
(iii) detecting radiation which is Rayleigh-backscattered within the length of fibre towards the input end to generate an output signal in response thereto.

DESCRIPTION OF FIGURES

Embodiments of the invention are described below by way of example only and with reference to the accompanying drawings in which FIG. 1 shows first example traffic sensing and monitoring apparatus of the invention;

FIG. 2 illustrates a pulse form used in the FIG. 1 apparatus;

FIG. 3 shows a second example traffic sensing and monitoring apparatus of the invention; and FIG. 4 illustrates a pulse form used in the FIG. 3 apparatus.

DESCRIPTION OF PREFERRED EMBODIMENTS

In FIG. 1, first example traffic sensing and monitoring apparatus of the invention, indicated generally by 100, comprises a cw laser 102, acousto-optic modulators (AOMs) 104, 106, an optical fibre 111 having a sensing portion 112 with proximal 115 and distal 121 ends, a photodetector 108 (e.g. a photodiode) and an interrogation system 110 arranged to obtain samples of the photodetector output signal, and to process the samples to produce an output signal. The optical output of laser 102 is coupled to an optical fibre 103. An optical fibre 107 is coupled to the fibre 103 by a coupler 119. Fibres 103, 107 are input to AOMs 104, 106 respectively. Outputs of the AOMs 104, 106 are coupled into optical fibres 111, 109 respectively, and fibre 109 is coupled to fibre 111 at a position 113. The optical path length between AOM 104 and the position 113 is greater than that between AOM 106 and position 113 due to a 24 m delay loop 105 of fibre 111. A sensing portion 112 of fibre 111 has a length of 5 km. An optical fibre 117 is coupled to proximal end 115 of sensing portion 112 so that radiation retro-reflected by Rayleigh-backscattering within the sensing portion 112 is coupled into fibre 117. Fibre 117 is coupled to the photodetector 108. The system 100 is deployed with the sensing portion 112 of the fibre 111 beneath, and substantially parallel to, a carriageway of a road (not shown). In order to sense and monitor traffic over long distance of road, several sets of the apparatus may be employed with sensing fibre portions that are contiguous, or near contiguous.

The apparatus 100 operates as follows. Radiation output from the laser 102 and coupled into fibre 103 is divided into two portions by the coupler 119. Respective portions are input to AOMs 104, 106. AOM 104 operates to convert cw radiation input to it to pulsed and frequency shifted radiation of frequency $\omega_2$ which is coupled into fibre 111. AOM 106 operates similarly to couple pulsed, frequency-shifted radiation into fibre 109, although the frequency shift applied exceeds that applied by AOM 104, radiation output from AOM 106 having a frequency $\omega_1$ where $\omega_1 - \omega_2 = \Omega$ is of the order of a few hundred kHz. Pulses output from AOM 106 into fibre 109 are coupled into fibre 111 at 113. Delay loop 105 has a length of 24 m so that pulses output from AOM 104 are delayed with respect to those output from AOM 106 by approximately 120 ns. (The speed v of pulses within the fibre is approximately $2 \times 10^8$ m/s). AOMs 104, 106 produce pulse pairs at a repetition rate of 20 kHz such that the sensing portion 112 of fibre 111 is interrogated every 50 μs by a pair of pulses, the pulses within each pair having a frequency difference of a few hundred KHz and a relative delay of approximately 120 ns.

FIG. 2 is a plot of intensity versus time for two pulse pairs introduced into the sensing portion 112 of fibre 111. Individual pulses have a duration $\tau_w$ of 50 ns. AOMs 104, 106 provide an extinction ratio of 50 dB.

Referring again to FIG. 1, distance along the sensing portion 112 of the fibre 111 is represented by x, the proximal end 115 of sensing portion 112 being at x=0. If the length of the fibre 117 is negligible, then a time t after the first of a pair of pulses enters proximal end 115 of sensing portion 112, the photodetector 108 detects a portion of the first pulse (of frequency $\omega_1$) that has been Rayleigh-backscattered from a position $x_1 = vt/2$ along fibre portion 112, and simultaneously detects a portion of the second pulse (of frequency $\omega_2$) of the pair that has been Rayleigh-backscattered from a position $x_2 = v(t-\tau)/2$, where $\tau = 120$ ns is the delay between the pulses of the pair. (The portion of the second pulse is backscattered a time $\tau/2$ after the portion of the first pulse is backscattered.) The section of fibre between the two back-scattering positions is approximately 12 m ($\approx x_1 - x_2 = v\tau/2$) in length. If there are no moving vehicles on a 12 m section of road above the 12 m section of the sensing portion 112 between $x_1$ and $x_2$, then the photodetector 108 outputs a beat signal of frequency $\Omega$ to the interrogation system 110. The interrogation system 110 samples the photodetector output signal at a time t after the first of each pulse pair passes the position 113 and processes the samples to generate an output signal corresponding to the frequency or phase of a signal composed of these samples. If a moving vehicle is present on the 12 m section of road, the optical path length of the corresponding 12 m section of the sensing portion 112 between $x_1$ and $x_2$ is modulated due to changing pressure exerted on that section. This results in phase-modulation of the radiation Rayleigh-backscattered from $x_1$ and a concomitant deviation of the frequency of the beat signal output from the photodiode 108 away from the value $\Omega$. The interrogation system 110 thus infers the presence of a moving vehicle on a ~12 m section of road between $x_1$ and $x_2$ from a deviation in the frequency of a signal composed of samples of the photodetector output signal, each sample being obtained at the same time t after the first pulse of each pulse pair passes the position 113. If there is no deviation of the frequency of this signal away from the value $\Omega$, this implies either that no vehicle is present on the section of road or that a static vehicle is present.

For example, to monitor a 12 m portion of road between x=2488 m and x=2500 m, the interrogation system 110 is arranged to sample the photodetector output signal approximately 25 μs after each pulse pair is introduced into the proximal end 115 of sensing portion 112. The particular 12 m section of road that is monitored may be varied by varying the time at which the photodetector output signal is sampled after the first pulse of each pulse pair passes the position 113.

The interrogation system 110 may also be arranged to sample the photodetector output signal at each of a plurality of times after each pulse pair is introduced into the sensing portion 112 to generate sets of samples, each set corresponding to a different 12 m section of the length 112 of fibre and hence to a different 12 m section of road. Each set is then processed to find the frequency or phase of signals corresponding to the samples of each set. The presence of a moving vehicle on a 12 m section of road corresponding to a particular set is again inferred from the frequency or phase of a signal corresponding to the samples of that set.

If the portion 112 of the fibre 111 is required to be 5 km or more in length, the fibre 111 is preferably made of standard optical fibre, as such fibre has the lowest loss per unit length of any commercially available fibre.

The duration $\tau_w$ of individual pulses determines the minimum spatial resolution of the apparatus 100 since individual pulses have a length $v\tau_w$ within the portion 112 of fibre 111. $\tau_w$ is preferably no shorter than is required to give the desired spatial resolution since reducing $\tau_w$ also reduces the energy of a portion of a pulse that is Rayleigh-backscattered from a given position within portion 112. The minimum pulse duration that may be generated by an AOM is around 50 ns, although AOMs provide a good extinction ratio on the order of 50 dB.

Since the time taken for radiation to travel from proximal end 115 of the sensing portion 112 to the distal end 121 and back is approximately 50 μs, the sensing portion 112 can be interrogated by pulses at a maximum rate of 20 kHz, although lower interrogation rates may be used if required. The minimum interrogation rate depends on the amplitude and frequency of traffic-induced modulation of the portion 112 of fibre 111.

Instead of using a delay loop 105 to delay one of the pulses of each pair with respect to the other, AOMs 104,106 may be arranged for repeated asynchronous operation, i.e. such that in each cycle of operation, AOM 104 begins to switch on 120 ns after AOM 106 begins to switch on. Alternatively, laser 102 may be a pulsed laser, output pulses of the laser 102 being divided at 119 and AOMs 104, 106 being operated synchronously.

Referring to FIG. 3, a second example traffic sensing and monitoring apparatus of the invention is indicated generally by 200. Parts of the apparatus 200 which correspond to parts of the apparatus 100 are labelled by reference signs differing by a value of 100 from those labelling corresponding parts in FIG. 1. The basic functioning of the apparatus 200 is the same as that of the apparatus 100 of FIG. 1. The apparatus 200 comprises a cw laser 202 and an integrated optical modulator (IOM) 214 arranged to generate pulses having a duration of 10 ns at a repetition rate of 20 kHz (i.e. the maximum interrogation rate of the 5 km sensing portion 212). IOM 214 provides an extinction ratio of approximately 30 dB. Individual pulses output by IOM 214 are divided by coupler 219 to produce pulse portions which are passed to respective AOMs 204, 206. Each AOM 204, 206 operates to reduce the intensity of the radiation input to it by a further 50 dB outside a time window having a duration of 50 ns centred on each 10 ns pulse generated by IOM 214. Fibre 211 has a 10 m delay loop 205 which retards a pulse output from AOM 204 by 50 ns with respect to a corresponding pulse simultaneously output from AOM 206. Interrogation system 210 therefore detects moving vehicles on 5 m sections of road above corresponding 5 m sections of the sensing portion 212 of fibre 211.

FIG. 4 is a plot of intensity versus time for two pulse pairs introduced into sensing portion 212 of fibre 211. Consecutive pulse pairs are separated in time by 50 μs. Between individual pulses within a pulse pair, IOM 214 provides an extinction ratio of 30 dB, however between consecutive pairs of pulses, the combined action of IOM 214 and AOMs 204, 206 provides an extinction ratio of 80 dB. The combination of IOM 214 with AOMs 204, 206 allows short pulse duration to be combined with a high extinction ratio.

In apparatus 200, the fibre 211 may be a polarisation-maintaining fibre so that a moving vehicle detected by a first section of the sensing portion 212 does not give rise to spurious detection of a vehicle on a 5 m section of road corresponding to a second section of sensing portion 212 located between the first section and the distal end 221 of the sensing portion 212 of fibre 211. In this case, the pulses introduced into the sensing portion 212 of fibre 211 must be polarised and launched into portion 212 such that they are polarised along one of the principal axes of the portion 212. The apparatus 100 of FIG. 1 may be similarly modified.

Occasionally, a particular section of the sensing portion 212 may give rise to Rayleigh-backscattered radiation which is too weak to provide a useful photodetector output signal. To overcome this potential problem when monitoring a particular 5 m section of road between positions $x_1=vt_0/2$ and $x_2=v(t_0-\tau)/2$ interrogation system 210 may also be arranged to sample the photodetector output signal at times $t_0\pm\Delta t$ after each pulse pair enters portion 212, in addition to sampling at $t_0$. These times correspond to sections of portion 212 located between positions $x_3=v(t+\Delta t)/2$, $x_4=v(t+\Delta t-\tau)/2$, and $x_5=v(t-\Delta t)/2$, $x_6=v(t-\Delta t-\tau)/2$. Positions $x_3$, $x_4$ and $x_5$, $x_6$ define 5 m sections of the sensing portion 212 that are displaced by $\pm v\Delta t/2$ from the 5 m section defined by $x_1$ and $x_2$. Thus, to monitor 5 m sections which are displaced by approximately ±1 m from the section between positions $x_1$ and $x_2$ the interrogation system 210 is arranged to sample the photodetector output signal at $t_0\pm10$ ns after each pulse pair enters sensing portion 212. Photodetector output signal samples taken at a time $t_0-\Delta t$ after each pulse pair enters portion 212 form a first set of samples. Samples taken at times $t_0$ and $t_0+\Delta t$ form second and third sets of samples. In this mode of operation, interrogation system 210 is arranged to continuously monitor the three sets of samples and to process the set having samples corresponding to the greatest signal having a frequency of approximately Ω. Alternatively, the interrogation system 210 may be arranged to change the set which is processed from a first set to a second set only when the samples of the second set correspond to signal which exceeds that of a signal to which samples of the first set correspond by at least a pre-determined amount, and which has a frequency of approximately Ω.

In order to reduce instances of discontinuity in the output signal of the interrogation system 210 when the set of samples that is processed is changed from a first set to a second set, both sets may be processed for a period to generate two output signals. In this case, the interrogation system 210 is arranged to evaluate the difference between the two output signals and to apply a corresponding offset to the second output signal to reduce any discontinuity in the output signal of the system 210 when the set that is processed is changed.

Cw laser 202 and IOM 214 may be replaced by a pulsed laser, with AOMs 204, 206 providing frequency-shifting, or frequency-shifting and pulse shortening, as described above.

The sensing portions 112, 212 of fibres 111, 211 may fixed to the surface of road as an alternative to laying beneath the surface.

The invention claimed is:

1. Traffic sensing and monitoring apparatus comprising a length l of optical fibre, a light source arranged to introduce a series of pulse pairs into an input end of the length, each of the pulse pairs comprising first and second pulses of radiation having a frequency difference Ω and the second pulse being delayed with respect to the first by a delay τ, and the apparatus further comprising a photodetector arranged to detect radiation which is Rayleigh-backscattered within the length of fibre towards the input end and to generate an output signal in response thereto said apparatus further comprising an interrogation system arranged to obtain a set of signal samples by sampling the photodetector's output signal and to process the signal samples to generate an output signal corresponding to the frequency or phase of a signal composed of said samples, wherein sets of signal samples are obtained by sampling the photodetector output signal at times $t_0-\Delta t$, $t_0$ and $t_0+\Delta t$ after the first pulse of each pulse pair enters the length l of optical fibre and to process the set having samples corresponding to the largest signal with a frequency of approximately Ω.

2. Apparatus according to claim 1 wherein the light source arranged to introduce a series of pulse pairs into the length of optical fibre is arranged to operate at a rate less than or equal to v/2l, preferably substantially v/2l, where v is the speed of the pulses in the length of optical fibre.

3. Apparatus according to claim 1 wherein vτ/2 substantially corresponds to the length of a unit of traffic to be sensed and monitored.

4. Apparatus according to claim 1 wherein the interrogation system is arranged to change the set which is processed from a first set to a second set when the samples of the second set correspond to a signal exceeding a signal to which samples of the first set correspond by at least a pre-determined amount.

5. Apparatus according to claim 1 wherein the interrogation system is arranged such that when the set which is processed is changed from a first set to a second set, both sets are processed for a period to generate first and second output signals, the interrogation system being further arranged to evaluate the difference between the second and the first output signals and to apply a corresponding offset to the second output signal to reduce any discontinuity between the first and second output signals.

6. Apparatus according to claim 1 wherein $\Delta t \leq \tau/10$.

7. Apparatus according to claim 1 where the length of optical fibre is a length of polarisation-maintaining fibre and the light source arranged to introduce the series of pulse pairs into the input end of the length of optical fibre is arranged to launch polarised pulse pairs into said length of fibre such that radiation individual pulses is polarised along a principal axis of the length of fibre.

8. Apparatus according to claim 1 wherein the light source arranged to introduce a series of pulse pairs into an input end of the length of optical fibre comprises an optical modulator arranged to receive a laser's output and to output pulsed radiation to first and second acousto-optic modulators (AOMs) arranged to output, respectively, a first pulse of radiation of frequency $\omega_1$ and a second pulse of radiation of frequency $\omega_2$, wherein $\omega_1 - \omega_2 = \Omega$, wherein each AOM receives a portion of each pulse output by the modulator and wherein each AOM is arranged to increase the extinction ratio of a pulse input to it outside a time window which includes the pulse.

9. Apparatus according to claim 8 wherein the modulator is an integrated optical modulator or a semiconductor optical amplifier.

10. Apparatus according to claim 1 wherein $\Omega$ is in the range 40 kHz $\leq \Omega \leq$ 40 MHz.

11. A method of sensing and monitoring traffic, the method comprising the steps of
  (i) providing a length of optical fibre on or below a surface for carrying vehicles such that the weight of a vehicle using the surface may act on said length;
  (ii) introducing a series of pulse pairs into an input end of the length, each of the pulse pairs comprising first and second pulses of radiation having a frequency difference $\Omega$ and the second pulse being delayed with respect to the first by a delay $\tau$;
  (iii) detecting radiation which is Rayleigh-backscattered within the length of fibre towards the input end to generate an output signal in response thereto;
  (iv) sampling he photodetector's output signal at times $t_0 - \Delta t$, $t_0$ and $t_0 + \Delta t$ after the first pulse of each pulse pair enters the length l of optical fibre to generate respective sets of samples;
  (v) processing samples obtained in step (iv) to generate an output signal corresponding to the frequency or phase of a signal composed of said samples; and
  (vi) processing the set having samples corresponding to the largest signal with a frequency of approximately $\Omega$.

12. A method according to claim 11 wherein pulse pairs are introduced into said length of optical fibre at a rate less than or equal to v/2l, preferably substantially v/2l, where v is the speed of the pulses in the length of optical fibre.

13. A method according to claim 11 wherein $v\tau/2$ substantially corresponds to the length of a unit of traffic to be sensed and monitored.

14. A method according to claim 11 wherein $\Delta t \leq \tau/10$.

* * * * *